US011910435B2

(12) United States Patent
Aboul-Magd et al.

(10) Patent No.: US 11,910,435 B2
(45) Date of Patent: *Feb. 20, 2024

(54) METHOD AND SYSTEM FOR WI-FI SENSING

(71) Applicant: HUAWEI TECHNOLOGIES CO., LTD., Shenzhen (CN)

(72) Inventors: Osama Aboul-Magd, Kanata (CA); Yan Xin, Kanata (CA); Jung Hoon Suh, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,323

(22) Filed: Feb. 17, 2023

(65) Prior Publication Data

US 2023/0284266 A1 Sep. 7, 2023

Related U.S. Application Data

(63) Continuation of application No. 17/206,387, filed on Mar. 19, 2021, now Pat. No. 11,589,386.

(51) Int. Cl.
*H04W 74/08* (2009.01)
*H04B 7/06* (2006.01)
(Continued)

(52) U.S. Cl.
CPC ...... *H04W 74/0808* (2013.01); *H04B 7/0626* (2013.01); *H04W 84/12* (2013.01)

(58) Field of Classification Search
CPC . H04W 74/0808; H04W 84/12; H04B 7/0626
See application file for complete search history.

(56) References Cited

U.S. PATENT DOCUMENTS 10,089,876 B1 * 10/2018 Ramasamy ............ G05D 1/028
10,255,805 B1 * 4/2019 Wolf .................. G08G 1/09626
(Continued)

FOREIGN PATENT DOCUMENTS

WO 2020231062 A1 11/2020

OTHER PUBLICATIONS

IEEE Standard for Information Technology—Telecommunications and ionformation exchange between systems—Local and metropolitan area networks—Specific requirements, Std 802.11n-2009, Oct. 29, 2009.
(Continued)

*Primary Examiner* — Harry H Kim

(57) ABSTRACT

A procedure and frame structure for Wi-Fi sensing is described. An aspect of the disclosure provides a method of sensing. Such the method includes sending, by an initiating station (STA) to a plurality of responder STAs, a sensing request comprising a sensing announcement frame indicating identifiers (ID) of the plurality of responder STAs. Such a method further includes receiving, by the initiating STA from the plurality of responder STAs, one or more responses based on the sensing request. In some embodiments, the announcement frame further indicates resource unit assignments for receiving acknowledgements from the plurality of responder STAs. In some embodiments, the method further includes receiving, by the initiating STA from the plurality of responder STAs, the acknowledgements indicating a willingness to participate in the sensing procedure.

20 Claims, 13 Drawing Sheets

(51) Int. Cl.
  *H04W 84/12*   (2009.01)
  *H04L 1/00*   (2006.01)
  *H04L 5/00*   (2006.01)

(56) References Cited

U.S. PATENT DOCUMENTS

| | | | |
|---|---|---|---|
| 11,109,203 B2* | 8/2021 | Moreira de Carvalho | ............... H04W 4/021 |
| 11,589,386 B2* | 2/2023 | Aboul-Magd | ........ H04L 1/0026 |
| 2018/0270608 A1* | 9/2018 | Thoresen | ............. H04W 12/06 |
| 2019/0090109 A1* | 3/2019 | Moreira de Carvalho | ............... H04W 4/50 |
| 2019/0130763 A1* | 5/2019 | Kawasaki | ......... H04B 7/15507 |
| 2019/0308614 A1* | 10/2019 | Lavoie | ................. B60R 25/245 |
| 2020/0157873 A1* | 5/2020 | Sabatini | ................ E05B 81/76 |
| 2020/0359299 A1 | 11/2020 | Suh et al. | |
| 2020/0401190 A1* | 12/2020 | Sim | .................... G06F 3/04817 |
| 2020/0408548 A1* | 12/2020 | DiCarlo | ............ G01C 21/3438 |
| 2021/0329554 A1* | 10/2021 | Beg | ...................... H04B 7/0413 |
| 2022/0150962 A1* | 5/2022 | Chen | .................... H04B 7/0626 |
| 2023/0171563 A1* | 6/2023 | Toner | ................... H04W 4/029 455/456.1 |

OTHER PUBLICATIONS

Wang et al., Literanture Review on Wireless Sensing—Wi-Fi Signal-Based Recognition of Human Activities, vol. 23(2), Apr. 2018.
Wikipedia, Channel State Information, Feb. 1, 2021.
Ma et al., WiFi Sensing with Channel State Information: A Survey, ACM Computing Survey, vol. 52(3), Jun. 2019.
Te et al., WiFi Vision: Sensing, Recognition, and Detection With Commodity MIMO-OFDM WiFi, IEEE Internet of Things Journal, vol. 7(9), Sep. 2020.
IEEE 802.11-20/0807r0, Cheng Chen et al., WLAN Sensing Definitions, May 2020, total 12 pages.
IEEE 802.11-20/0842r0, Claudio da Silva et al., A Channel Measurement Procedure for WLAN Sensing, Jun. 2020, total 14 pages.

* cited by examiner

| Order | Information |
|---|---|
| 1 | Category |
| 2 | Sensing |
| 3 | Sensing Measurements |

METHOD AND SYSTEM FOR WI-FI SENSING

CROSS-REFERENCE TO RELATED APPLICATIONS

The application is a continuation of U.S. patent application Ser. No. 17/206,387, entitled "A METHOD AND SYSTEM FOR WI-FI SENSING" filed on Mar. 19, 2021 the entire contents of which are incorporated herein by reference.

FIELD OF THE INVENTION

The present invention pertains to the field of communication networks, and in particular to a procedure and frame structure for Wi-Fi sensing.

BACKGROUND

Channel state information (CSI) was introduced in 802.11n and 802.11ac in the context of multiple-input and multiple-output (MIMO).

CSI may reflect the wireless signal propagation characteristics for a link from a transmitter to a receiver at certain carrier frequencies. CSI measurements may include information when wireless signals transmit through surrounding objects and humans in time, frequency, and spatial domains. Accordingly, the use of CSI measurements for wireless sensing applications has been proposed. However, there is an ongoing need for a suitable frame structure for doing so. Further, format of CSI information, which may be used by legacy devices, may not be compatible with feedback information that may be required for sensing purposes. In addition, feedback information that may be received in 802.11n may have a format different from that of 802.11ac, which further limits processing such feedback information for sensing purposes.

Therefore, there is a need for a system and methods for a procedure and frame structure for Wi-Fi sensing that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An aspect of the disclosure provides a method of sensing. As such, the method includes sending, by an initiating station (STA) to a plurality of responder STAs, a sensing request comprising a sensing announcement frame indicating identifiers (ID) of the plurality of responder STAs. Such a method further includes receiving, by the initiating STA from the plurality of responder STAs, one or more responses based on the sensing request. In some embodiments, the announcement frame further indicates resource unit assignments for receiving acknowledgements from the plurality of responder STAs. In some embodiments, the method further includes receiving, by the initiating STA from the plurality of responder STAs, the acknowledgements indicating a willingness to participate in the sensing procedure.

In some embodiments, the method further includes sending, by the initiating STA to the plurality of responder STAs, a sensing feedback request (SFR) trigger frame (TF). In some such embodiments, the one or more responses comprise one or more sensing feedbacks comprising channel state information (CSI) based on the one or more sensing frames. In some embodiments, the sensing announcement frame indicates a downlink sensing. In some such embodiments, the method further includes sending, by the initiating STA to the plurality of responder STAs, one or more sensing frames. In some embodiments, the sensing announcement frame further indicates the one or more sensing frames to be sent to the plurality of responder STAs.

In some embodiments, the one or more sensing frames are null-data-packet-like frames. In some embodiments, the sensing SFR TF is broadcasted or multi-casted to the plurality of responder STAs. In some embodiments, the SFR TF indicates resource assignment for simultaneous transmission of the one or more sensing feedbacks.

In some embodiments, the method further includes sending, by the initiating STA to a first responder STA of the plurality of responder STAs, a first sensing feedback request (SFR) poll frame. In some such embodiments, the receiving, by the initiating STA from the plurality of responder STAs, one or more responses based on the sensing request includes receiving, by the initiating STA from the first responder STA, a first sensing feedback comprising channel state information (CSI).

In some embodiments, the first SFR poll frame indicates an ID of the first responder STA. In some embodiments, the method further includes after receiving the first sensing feedback, sending by the initiating STA to a second responder STA of the plurality of responder STAs, a second sensing feedback request (SFR) poll frame; and receiving, by the initiating STA from the second responder STA, a second sensing feedback, based on the one or more sensing frames.

In some embodiments, the second SFR poll frame indicates an ID of the second responder STA. In some embodiments, one or more sensing frames are sent at a frame rate indicated by the sensing announcement frame.

In some embodiments, the sensing announcement frame further indicates, for each responder STA of the plurality of responder STAs, a feedback type comprising one or more of: phase channel information and amplitude channel information.

In some embodiments, each of the one or more sensing frames comprises one or more of: a legacy preamble, a PHY header field, sensing short training field, a long training field, and a sensing training field.

In some embodiments, the sensing training field comprises a plurality of training units for one or more channel state information (CSI) measurements.

In some embodiments, the sending, by the initiating STA to the plurality of responder STAs, one or more sensing frames comprises: sending, by the initiating STA to a first responder STA of the plurality of responder STAs, a first sensing frame; and the receiving, by the initiating STA from the plurality of responder STAs, one or more responses based on the sensing request includes receiving, by the initiating STA from the first responder STA, a first sensing feedback comprising CSI measurements based in part on the first sensing frame. In some such embodiments, the method further includes sending, by the initiating STA to the first responder STA, a second sensing frame; and receiving, by the initiating STA from the first responder STA, a second sensing feedback based in part on the second sensing frame and the first sensing feedback, wherein the second sensing feedback is a difference of CSI measurements compared to the first sensing feedback.

In some embodiments, the sensing request further comprises one or more of: a sensing frame and a sensing feedback request (SFR). In some embodiments, the SFR is one of a trigger frame (TF) and poll frame.

In some embodiments, the method further includes sending, by the initiating STA to the plurality of responder STAs, a sensing feedback request (SFR) trigger frame (TF). In some such embodiments, the sensing announcement frame further indicates an uplink (UL) sensing, the receiving, by the initiating STA from the plurality of responder STAs, one or more responses based on the sensing request includes receiving, by the initiating STA from the plurality of responder STAs, one or more sensing frames based in part on the sensing announcement frame and the SFR TF.

In some embodiments, the sensing announcement frame further indicates the one or more sensing frames to be used by each responder STA of the plurality of responder STAs.

In some embodiments, the method further includes sending, by the initiating STA to a first responder STA of the plurality of responder STAs, a first sensing feedback request (SFR) poll frame. In some such embodiments, the receiving, by the initiating STA from the plurality of responder STAs, one or more responses based on the sensing request receiving, by the initiating STA from the first responder STA, a first sensing frame based in part on the sensing announcement frame and the first SFR poll frame.

In some embodiments, the method further includes after receiving the first sensing frame, sending by the initiating STA to a second responder STA of the plurality of responder STAs, a second sensing feedback request (SFR) poll frame; and receiving, by the initiating STA from the second responder STA, a second sensing frame, based in part on the sensing announcement frame and the second SFR poll frame.

Another aspect of the disclosure provides a method of sensing. Such a method includes receiving, by a responder station (STA) from an initiating STA, a sensing request comprising a sensing announcement frame indicating an identifier (ID) of the responder STAs; and sending, by the responder STA to the initiating STA, one or more responses based on the sensing request.

In some embodiments, the sensing announcement frame indicates a downlink sensing. In some such embodiments, the method further incudes receiving, by the responder STA from the initiating STA, one or more sensing frames. In some such embodiments, the method further incudes receiving, by the responder STA from the initiating STA, a sensing feedback request (SFR). In some such embodiments, the one or more responses comprises one or more sensing feedbacks comprising channel state information (CSI) based on the one or more sensing frames. In some embodiments, the SFR is one of a trigger frame and poll frame.

In some embodiments, the method further includes receiving, by the responder STA from the initiating STA, a sensing feedback request (SFR); wherein the sensing announcement frame further indicates an uplink sensing. In some such embodiments, the sending, by the responder STA to the initiating STA, one or more responses based on the sensing request includes sending, by the responder STA to the initiating STA, one or more sensing frames based in part on the sensing announcement frame and the SFR. In some such embodiments, the SFR is one of a trigger frame and poll frame.

Other aspects of the disclosure provide for apparatus, and systems configured to implement the methods disclosed herein. For example, wireless stations and access points can be configured with machine readable memory containing instructions, which when executed by the processors of these devices, configures the device to perform the methods disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 12 illustrates a sensing feedback frame design, according to an embodiment of the present disclosure.

It will be noted that throughout the appended drawings, like features are identified by like reference numerals.

DETAILED DESCRIPTION

Figure 1:
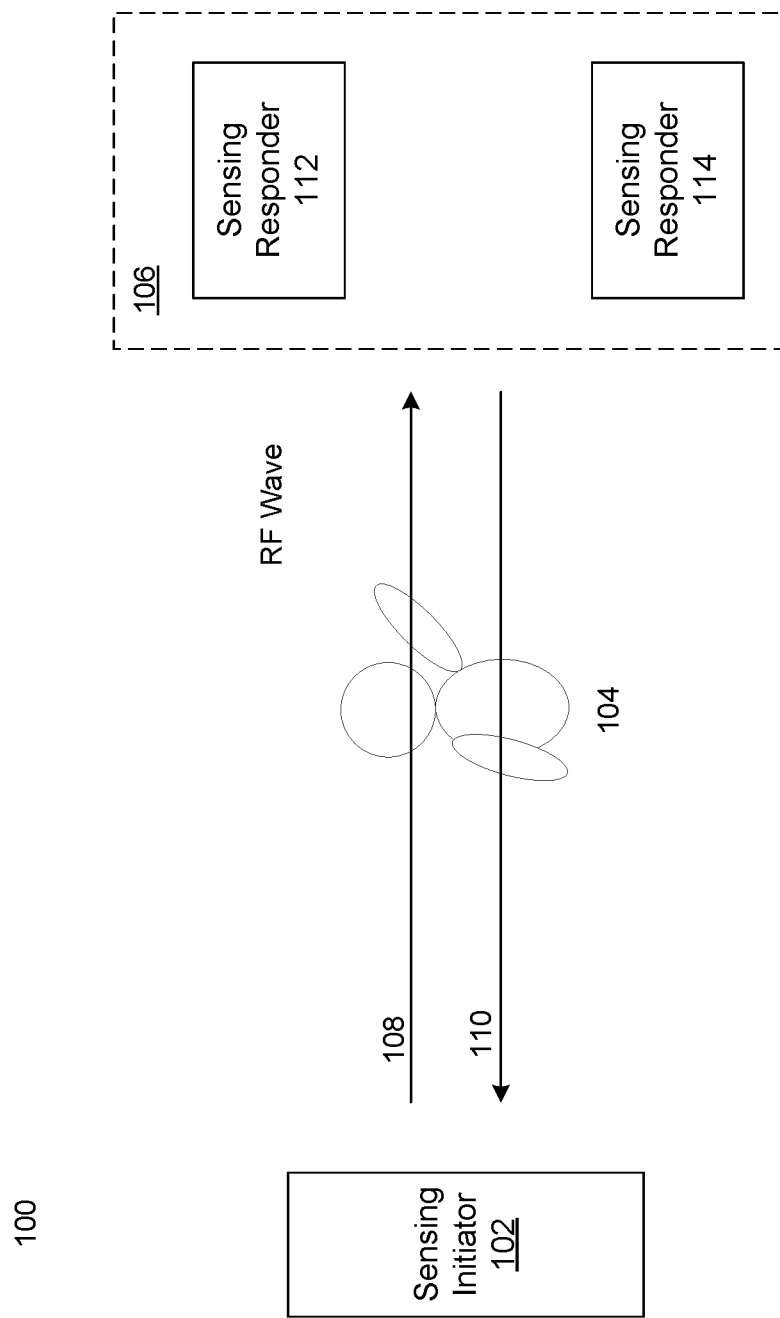
FIG. 1 illustrates a CSI-based sensing setup, according to an embodiment of the present disclosure.

It has been proposed to use a Wi-Fi radio frequency (RF) signal for sensing, e.g., for identification and recognition of human activities and other applications.

Channel State Information (CSI) capabilities were first introduced in 802.11n in the context of multiple-input and multiple-output (MIMO). The CSI training sequence, as may be appreciated by a person skilled in the art, may be designed to measure the channel characteristics between a transmitter and a receiver. CSI may represent how an electric signal propagates from a transmitter to a receiver and the combined effect of scattering, fading, and power decay with distance of the signal.

Accordingly, an aspect of the disclosure is directed to using the CSI for sensing. An aspect of the disclosure provides Wi-Fi sensing methods which monitor changes in the CSI (e.g., amplitude, phase and other characteristics). Embodiments of the disclosure may process changes to the CSI sequence to identify certain events such as human gestures, human identity (based on personal gait), etc.

CSI may reflect the wireless signal propagation characteristics for a link from a transmitter to a receiver at certain carrier frequencies. CSI measurements may include information when wireless signals transmit through surrounding objects and humans in time, frequency, and spatial domains. CSI measurements may be used for various wireless sensing applications. CSI measurements may include amplitude variation in CSI in the time domain, phase shifts in CSI in the spatial and frequency domains (e.g., transmit/receive antennas and carrier frequencies), phase shifts in CSI in the time domain.

Amplitude variations in CSI in the time domain may indicate different patterns for different humans, activities, gestures, etc. Phase shifts in CSI in the spatial and frequency domains may be related to signal transmission delay and direction which may be used for human localization and tracking. Phase shifts in CSI in the time domain may demonstrate different dominant frequency components which can be used to estimate breathing rate.

Embodiments may provide for a standardized protocol for sensing procedures based on signals that are defined for sensing.

Use of legacy Wi-Fi devices for sensing may present challenges since the format of the CSI information is not directly compatible with the feedback information required for sensing. As the IEEE 802.11 WG has begun the technical activity related to sensing, a sensing protocol and the information required to facilitate the sensing process may be desirable.

Embodiments may provide for a sensing frame and the related PPDU formats. Embodiments may further provide for a sensing procedure initiated by an access point (AP) or a non-AP station (STA) as a sensing initiator using sensing announcement frame. Embodiments may further provide for a sensing announcement frame format including an indication and grouping of sensing responders. Embodiments may further provide for downlink (DL) and uplink (UL) sensing procedures. Embodiments may further provide for high level design of the sensing feedback frame. Embodiments may further provide for differential sensing as further described herein.

FIG. 1 illustrates a CSI-based sensing setup, according to an embodiment of the present disclosure. The setup in FIG. 1 may be for a sensing process aimed at, for example, identifying and detecting human activities. The setup 100 may include a sensing initiator 102 which may reside at an access point (AP) or at a non-AP station (STA). The setup 100 may further include one or more sensing responders (106), for example sensing responders 112 and 114. The one or more sensing responders may be a Wi-Fi STA capable of performing sensing actions as described herein. The sensing initiator 102 may initiate the sensing process and determine which devices (for example, one or more sensing responders 106) may be requested 108 to send one or more of sensing frame and/or sensing feedback.

The one or more sensing responders 106 may receive the sensing request 108 from the sensing initiator 102 and send, to the sensing initiator 102, the one or more of sensing feedback and/or sensing frame 110.

As may be appreciated by a person skilled in the art, downlink (DL) procedure or process may refer to embodiments in which one or more sensing frames may be carried in a sensing PPDU and transmitted by the sensing initiator 102 toward the sensing responders 106. DL direction may refer to the direction toward the sensing responders 106 from the sensing initiator 102.

Similarly, uplink (UL) procedure or process may refer to embodiments in which one or more sensing frames may be carried in a sensing PPDU and transmitted by the one or more sensing responders 106 toward the sensing initiator. And UL direction may refer to the direction toward the sensing initiator 102 from the sensing responders 106.

Figure 2:
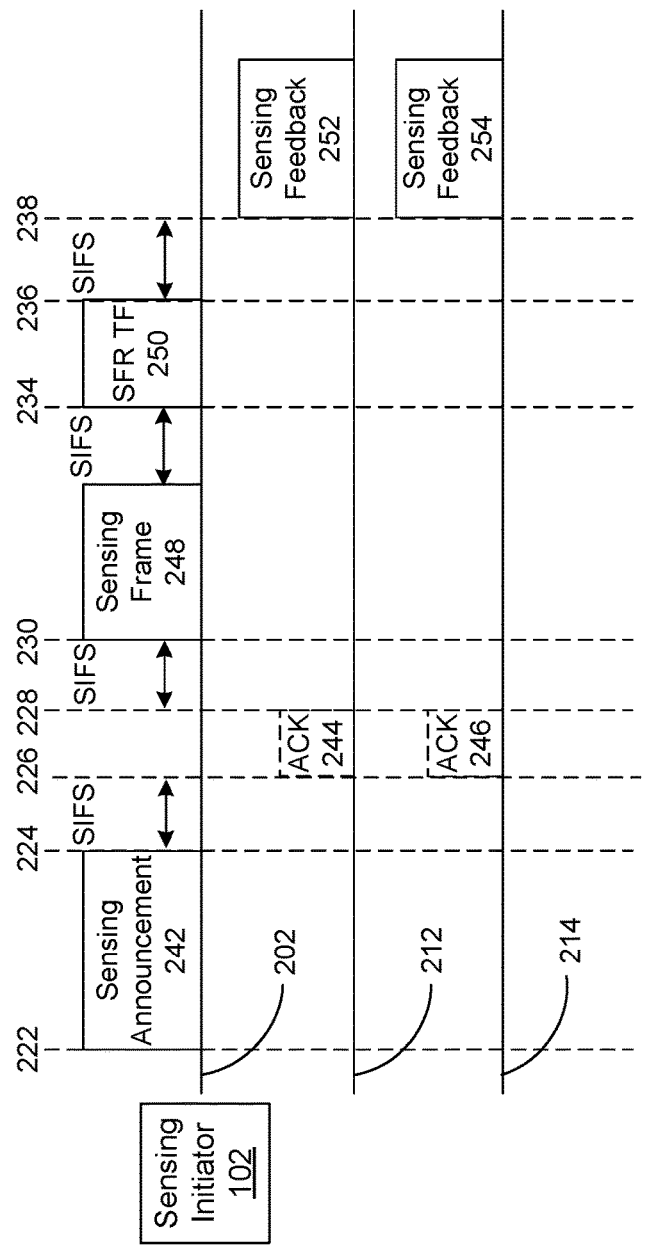
FIG. 2 illustrates a downlink (DL) sensing procedure with parallel feedback, according to an embodiment of the present disclosure.

FIG. 2 illustrates a downlink (DL) sensing procedure with parallel feedback, according to an embodiment of the present disclosure. Line 202 may represent actions performed by the sensing initiator 102 with respect to time. Lines 212 and 214 may represent actions performed by sensing responders 106 (e.g., receptively sensing responder 112 and 114).

Sensing procedure or process 200 may begin at time 222, in which the sensing initiator 102 may announce via the sensing announcement 242 that a sensing procedure is to begin. In some embodiments, the sensing initiator 102 may send the sensing announcement 242 to the sensing responders 106 (e.g., sensing responders 112 and 114).

The sensing announcement 242 may indicate the device identifiers (e.g., STA ID (i.e., association ID (AIDs)) from which feedback is expected. The sensing announcement 242 may also group devices into groups to focus on a particular sensing sequencing. The sensing announcement 242 may also indicate how many sensing frames are to follow and the frame rate as well as other parameters such as the Bandwidth and MCS.

At time 226, the sensing responders 106 (e.g., sensing responder 112 and sensing responder 114) may send an acknowledgement (ACK) 244 and 246. ACK 244 and 246 may be optional and may be transmitted by sensing responders 106 (e.g., sensing responder 112 and sensing responder 114) to indicate their willingness to participate in the sensing process 200. ACK 244 and 246 may be transmitted SIFS (shortest interframe spacing) time units after the reception (e.g., reception may be at time 224 and transmission at time 226) of the sensing announcement frame 242. In some embodiments, If ACKS (e.g., ACKs 244 and 246) are required then the sensing announcement frame 242 may include the resource unit (RU) assignment for the ACKs from different devices (e.g., sensing responders 112 and 114). The ACK frames are the responses from the sensing responders indicating to the initiator the responders' agreement with the sensing parameters.

As may be appreciated by a person skilled in the art, SIFS is an example of interframe spacing, and in other embodiments, other substitutes of interframe spacing may be used.

The sensing initiator 102 may then send sensing frame 248 to sensing responders 106 (e.g., sensing responder 112 and sensing responder 114). In embodiments in which ACKs (e.g., ACK 244 and 246) may be required, the sensing initiator 102 may send (e.g., at time 230) the sensing frame 248 SIFS time units after the reception (e.g., at time 228) of the ACKs. In embodiments in which ACKs is not required, the sensing initiator 102 may send (e.g., at time 226) the sensing frame 248 SIFS units after sending the sensing announcement 242.

As may be appreciated by a person skilled in the art, sensing frame 248 may be a null data packet (NDP) like frame. The sensing frame 248 may correspond to one or more sensing sequences. In some embodiments, the structure of the sensing frame 248 may indicate an integer number of subcarriers, which may be, for example, 64 or 256 subcarriers. As the sensing frame is transmitted through space, which may include, for example, an object, subcarriers' characteristics (e.g., amplitude, phase) may be changed.

SIFS units after sending the sensing frame 248, at time 234, sensing initiator 102 may send sensing feedback request (SFR) trigger frame (TF) 250 to sensing responders 106 (e.g., sensing responder 112 and sensing responder 114). In some embodiments, the sensing initiator 102 may broadcast the SFR TF 250 to sensing responders 106 (e.g., sensing responder 112 and sensing responder 114). In some embodiments, the sensing initiator 102 may multicast the SFR TF 250 to sensing responders 106 (e.g., sensing responder 112 and sensing responder 114) by indicating, in the SFR TF 250, the addresses of the sensing responders 106.

SIFS units after receiving the SFR TF 250 (e.g., reception at time 236), sensing responders 106 (e.g., sensing responder 112 and sensing responder 114) may send to the sensing initiator 102, at the same time 238, sensing feedback 252 and 254 as illustrated. Sensing feedback frames 252 or 254 may include the CSI feedback based on the designated sensing frame. In some embodiments, the RU or the spatial resource assignments may be indicated in the SFR TF 250 for the simultaneous transmission of Sensing Feedback.

As may be appreciated by a person skilled in the art, one sensing announcement e.g., sensing announcement 242, may be applied to a series of operations of transmitting sensing frames (e.g., sensing frame 248) and SFR (e.g., SFT RF 250) from the sensing initiator 102 to the sensing responder 106 (e.g., sensing responders 112 and 114) and transmitting sensing feedback (e.g., sensing feedback 252 and 254), in parallel, from the sensing responder 106 to the sensing initiator 102.

Figure 3:
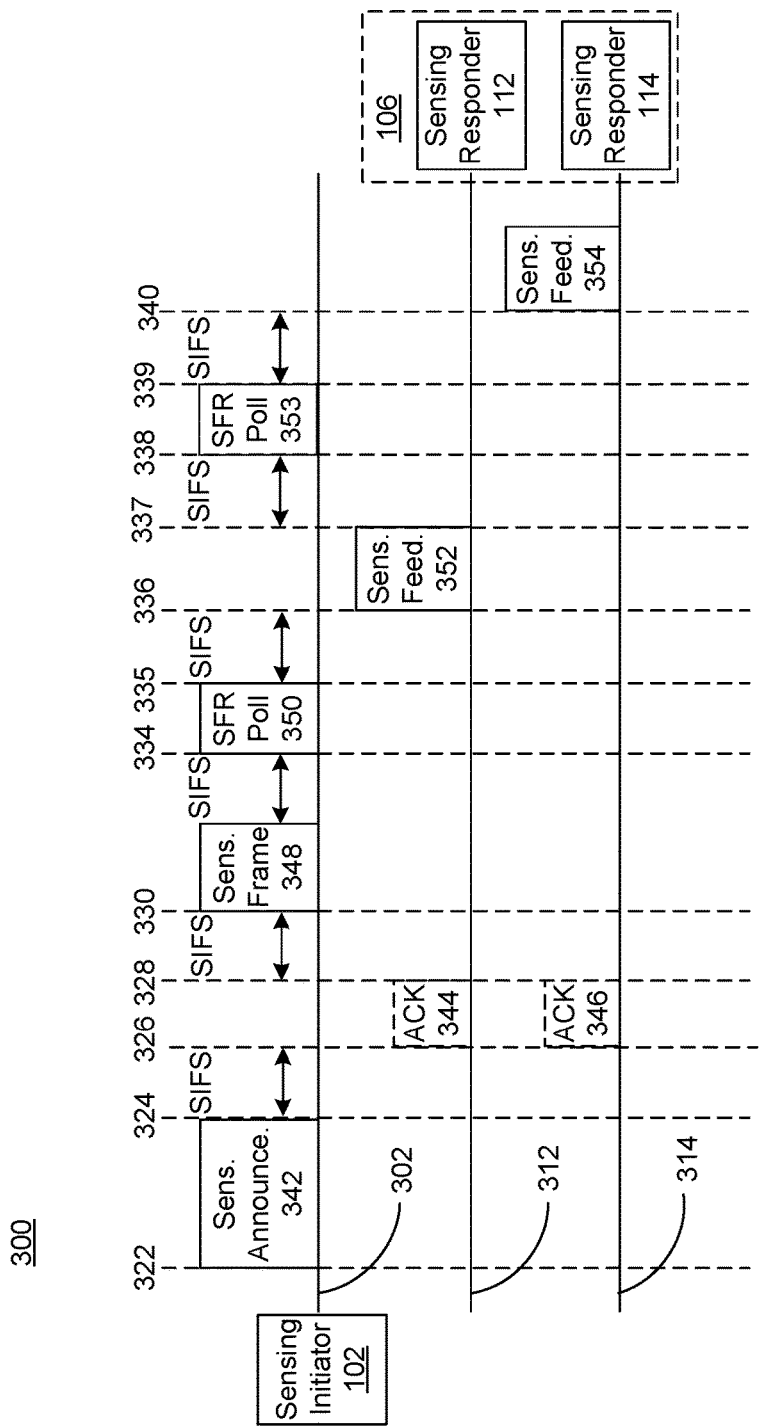
FIG. 3 illustrates a DL sensing procedure with serial feedback, according to an embodiment of the present disclosure.

FIG. 3 illustrates a downlink (DL) sensing procedure with serial feedback, according to an embodiment of the present disclosure. Line 302 may represent actions performed by the sensing initiator 102 with respect to time. Lines 312 and 314 may represent actions performed by sensing responders 106 (e.g., receptively sensing responder 112 and 114).

Sensing procedure or process 300 may begin at time 322, in which the sensing initiator 102 may announce via the sensing announcement 342 that a sensing procedure is to begin. In some embodiments, the sensing initiator 102 may send the sensing announcement 342 to the sensing responders 106 (e.g., sensing responders 112 and 114).

The sensing announcement 342 may be similar to sensing announcement 242 of FIG. 2 with possible modifications in some embodiments. For example, the sensing announcement 342 may indicate the device identifiers (e.g., STA ID (i.e., AIDs) from which feedback is expected. The sensing announcement 342 may also group devices into groups to focus on a particular sensing sequencing.

At time 326, the sensing responders 106 (e.g., sensing responder 112 and sensing responder 114) may send an acknowledgement (ACK) 344 and 346. ACK 344 and 346 may be optional and may be transmitted by sensing responders 106 (e.g., sensing responder 112 and sensing responder 114) to indicate their willingness to participate in the sensing process 300. ACK 344 and 346 may be transmitted SIFS time units after the reception (e.g., reception may be at time 324 and transmission at time 326) of the sensing announcement frame 342. In some embodiments, If ACKS (e.g., ACKs 344 and 346) are required then the sensing announcement frame 342 may include the RU assignment for the ACKs from different devices (e.g., sensing responders 112 and 114).

The sensing initiator 102 may then send sensing frame 348 to sensing responders 106 (e.g., sensing responder 112 and sensing responder 114). In embodiments in which ACKs (e.g., ACK 344 and 346) may be required, the sensing initiator 102 may send (e.g., at time 330) the sensing frame 348 SIFS time units after the reception (e.g., at time 328) of the ACKs. In embodiments in which ACKs is not required, the sensing initiator 102 may send (e.g., at time 326) the sensing frame 348 SIFS units after sending the sensing announcement 342.

Sensing frame 348 may be similar to sensing frame 248. Sensing frame 348 may be an NDP like frame and may correspond to one or more sensing sequences. SIFS units after sending the sensing frame 348, sensing initiator 102 may send, at time 334, SFR poll 350 to a first sensing responder e.g., sensing responder 112, of the sensing responders 106. The SFR poll 350 may carry the targeting STA ID (e.g., MAC address or AID of the sensing responder 112) and may include the CSI feedback based on the designated sensing frame. In some embodiments, sensing initiator 102 may unicast the SFR poll 350 to the first sensing responder e.g., sensing responder 112, of the sensing responders 106.

SIFS units after receiving the SFR TF poll 350 (e.g., reception at time 335), the first sensing responder e.g., sensing responder 112, of the sensing responders 106 may send to the sensing initiator 102, at time 336, sensing feedback 352 as illustrated. SIFS units after receiving (e.g., reception at time 337), sensing initiator 102 may send, at time 338, another SFR poll 353 to a second sensing responder e.g., sensing responder 114, of the sensing responders 106. The SFR poll 353 may carry the targeting STA ID (e.g., MAC address or AID of the sensing responder 114) and may include the CSI feedback based on the designated frame. In some embodiments, sensing initiator 102 may unicast the SFR poll 353 to the second sensing responder e.g., sensing responder 114, of the sensing responders 106.

SIFS units after receiving the SFR TF poll 353 (e.g., reception at time 339), the second sensing responder e.g., sensing responder 114, of the sensing responders 106 may send to the sensing initiator 102, at time 340, sensing feedback 354 as illustrated.

As may be appreciated by a person skilled in the art, one sensing announcement e.g., sensing announcement 342, may be applied to a series of operations of transmitting sensing frame (e.g., sensing frame 348) and SFR poll (e.g., SFT poll 350 and 353) from the sensing initiator 102 to the sensing responder 106 (e.g., sensing responders 112 and 114) and transmitting sensing feedback (e.g., sensing feedback 352 and 354), in serial (non-parallel), from each sensing responder 106 (e.g., sensing responder 112 and sensing responder 114) to the sensing initiator 102.

Figure 4:
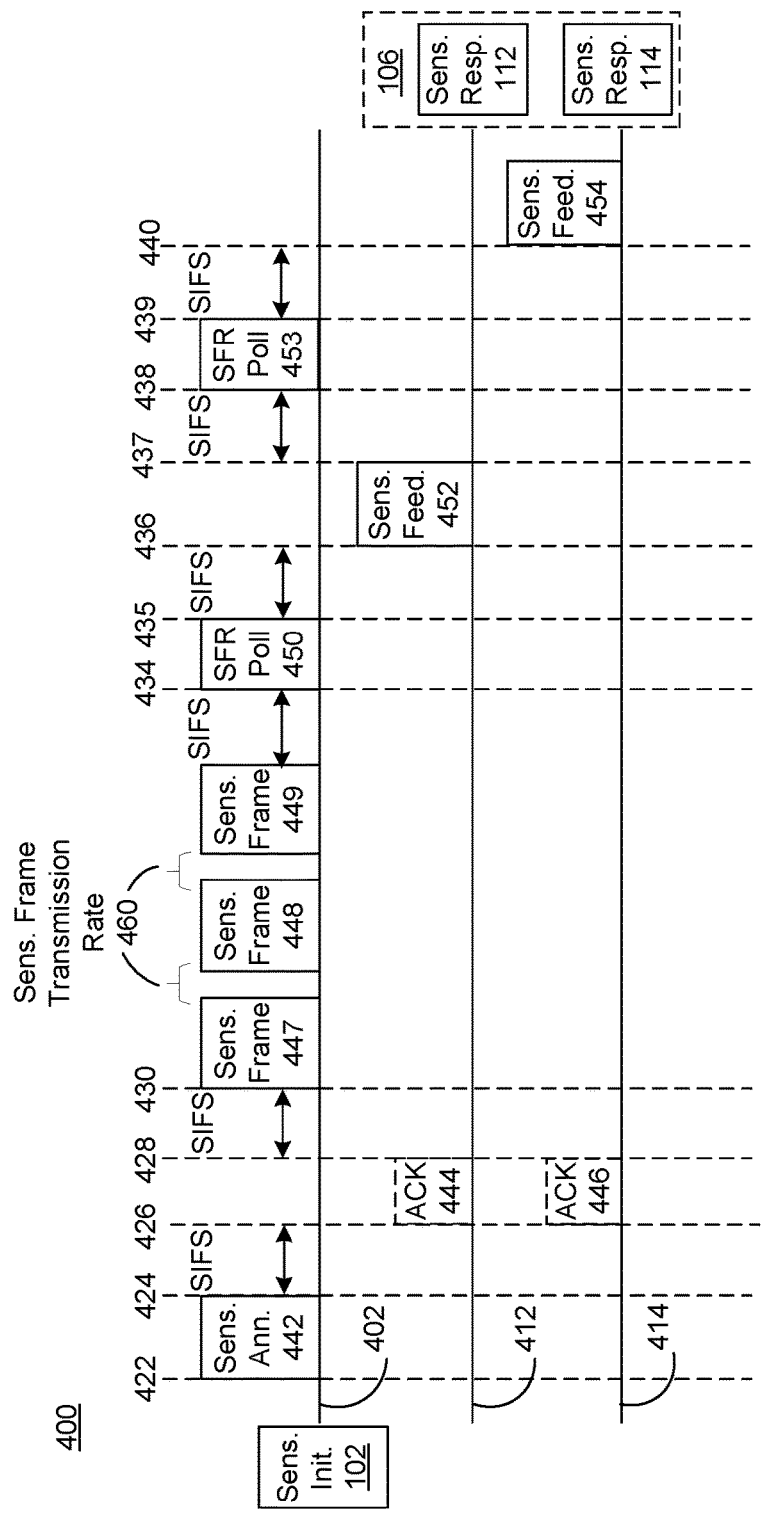
FIG. 4 illustrates a DL sensing procedure with a periodic sensing frame according to an embodiment of the present disclosure.

FIG. 4 illustrates a DL sensing procedure with a periodic sensing frame transmission according to an embodiment of the present disclosure. Line 402 may represent actions performed by the sensing initiator 102 with respect to time.

Lines 412 and 414 may represent actions performed by sensing responders 106 (e.g., receptively sensing responder 112 and 114).

Sensing procedure or process 400 may begin at time 422, in which the sensing initiator 102 may announce via the sensing announcement 442 that a sensing procedure is to begin. In some embodiments, the sensing initiator 102 may send the sensing announcement 442 to the sensing responders 106 (e.g., sensing responders 112 and 114).

The sensing announcement 442 may be similar to sensing announcements 342 and 242 with possible modifications. The sensing announcement 442 may indicate how many sensing frames are to follow and how often the frame is transmitted (sensing frame transmission rate). For example, in an embodiment, the sensing announcement 442 may indicate that three sensing frames 447, 448 and 449 are to follow with a sensing frame transmission rate 460, as illustrated. Sensing frames 447, 448 and 449 may the same or different sensing frames. As may be appreciated by a person skilled in the art, sensing frame transmission rate 460 may refer to the interframe time related to the sensing frames 447, 448, and 449 as illustrated.

Similar to FIGS. 2 and 3, the ACK 444 and 446 sent, at time 426 (SIFS time units after reception, at time 424, of the sensing announcement 442) respectively by sensing responder 112 and 114 may be optional. SIFS units after receiving ACKs 444 and 446 (e.g., reception at time 428), sensing initiator 102 may send, to sensing responders 106 (e.g., sensing responder 112 and 114) sensing frame 447, 448 and 449 at sensing frame transmission rate 460 as illustrated. Although three sensing frames 447, 448, and 449 are illustrated, the number of corresponding sensing frames and the sensing frame transmission rate may vary, as may be appreciated by a person skilled in the art.

In some embodiments, multiple sensing frames (e.g., sensing frames 447, 448, 449 of FIG. 4) may be needed to perform the requirement measurements (e.g., comparative measurement, selective measurements, etc.).

SIFS units after sending the sensing frames 447, 448 and 449, sensing initiator 102 may send, at time 434, SFR poll 450 to a first sensing responder e.g., sensing responder 112, of the sensing responders 106. The SFR poll 450 may carry the targeting STA ID (e.g., MAC address or AID of the sensing responder 112) and may include the CSI feedback based on the designated sensing sequence. In some embodiments, sensing initiator 102 may unicast the SFR poll 450 to the first sensing responder e.g., sensing responder 112, of the sensing responders 106.

SIFS units after receiving the SFR TF poll 450 (e.g., reception at time 435), the first sensing responder e.g., sensing responder 112, of the sensing responders 106 may send to the sensing initiator 102, at time 436, sensing feedback 452 as illustrated. SIFS units after receiving (e.g., reception at time 437), sensing initiator 102 may send, at time 438, another SFR poll 453, (SIFS time units after reception) to a second sensing responder e.g., sensing responder 114, of the sensing responders 106. The SFR poll 453 may carry the targeting STA ID (e.g., MAC address or AID of the sensing responder 114) and may include the CSI feedback based on the designated sequence. In some embodiments, sensing initiator 102 may unicast the SFR poll 453 to the second sensing responder e.g., sensing responder 114, of the sensing responders 106.

SIFS units after receiving the SFR TF poll 453 (e.g., reception at time 439), the second sensing responder e.g., sensing responder 114, of the sensing responders 106 may send to the sensing initiator 102, at time 440, sensing feedback 454 as illustrated.

Although process 400 illustrates periodic sensing frames with serial feedback, a person skilled in the art may appreciate that periodic sensing frames may also be used with parallel feedback.

As described herein, embodiments may provide for a common procedure for initiating a sensing process and receiving sensing measurements from designated devices.

Figure 5:
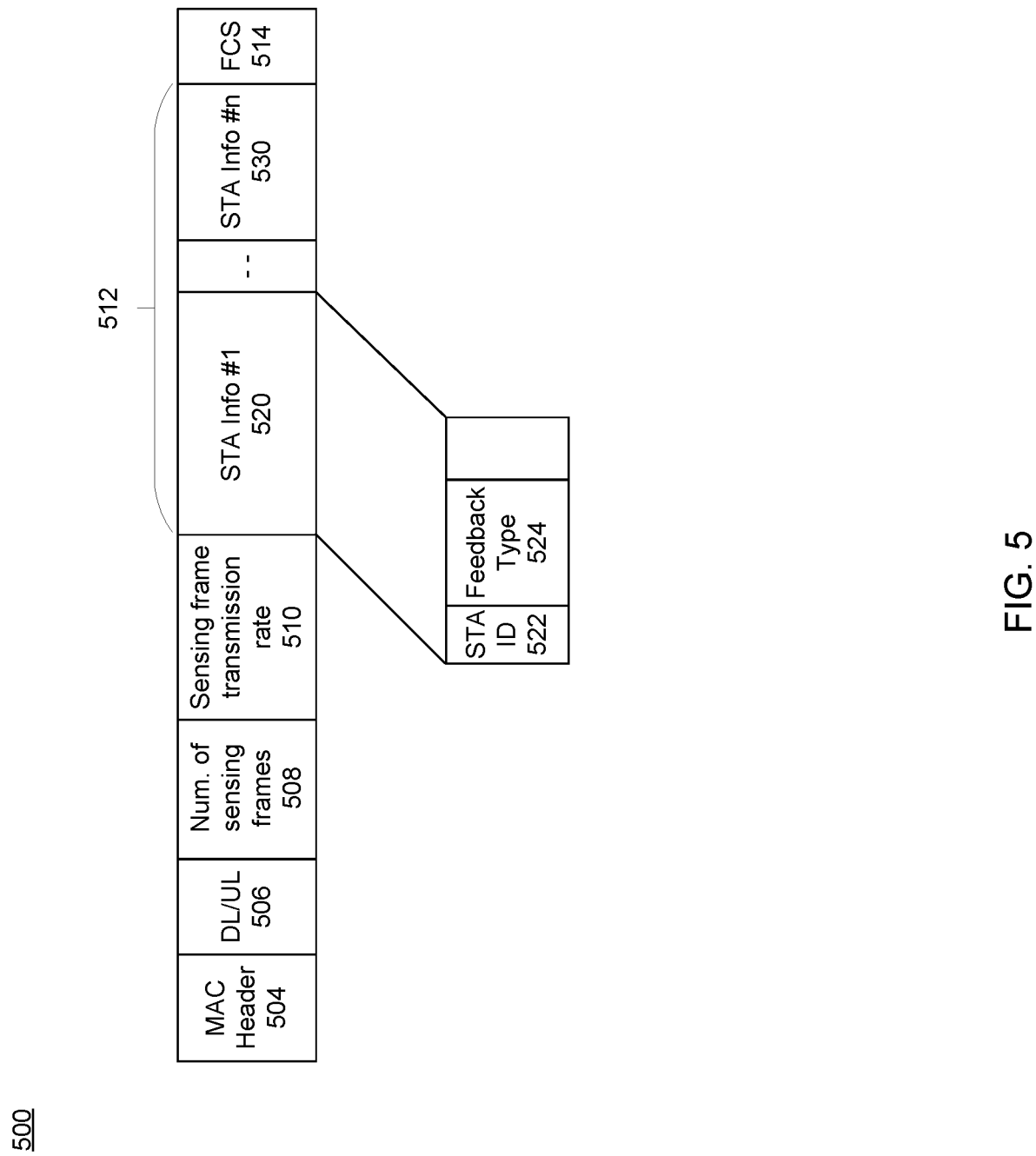
FIG. 5 illustrates a DL sensing announcement frame, according to an embodiment of the present disclosure.

FIG. 5 illustrates a DL sensing announcement frame, according to an embodiment of the present disclosure. The DL sensing announcement frame 500 may be similar to sensing announcement frames 242, 342 and 442 with possible modifications. The DL sensing announcement frame 500 may comprise one or more of a MAC header 504, an indicator of DL or UL 506, an indicator of number of sensing frames 508, an indicator of frequency of sensing frames 510 and frame check sequence (FCS) 514. The DL/UL indicator 506 may indicate if the sensing requested is DL and/or UL. The FCS 514 may check error for the MAC frame as may be appreciated by a person skilled in the art.

The sensing announcement frame 500 may further comprise one or more STA info fields 512 (e.g., STA-1 info 520, STA-n info 530) as illustrated. STA info field 512 may refer to the sensing responders 106. In an embodiment, there may be n number of sensing responders, such that the STA info field 512 may comprise n fields corresponding to the n number of sensing responders.

STA Info field, e.g., STA-1 info field 520, may identify a STA ID (e.g., AID) 522 and a feedback type 524 (e.g., phase or amplitude or combination of both or other channel information). STA Info field may also indicate those subcarriers for which feedback is requested. STA Info field may also include any other relevant information such as spatial resource, transmit/receive antennas.

Figure 6:
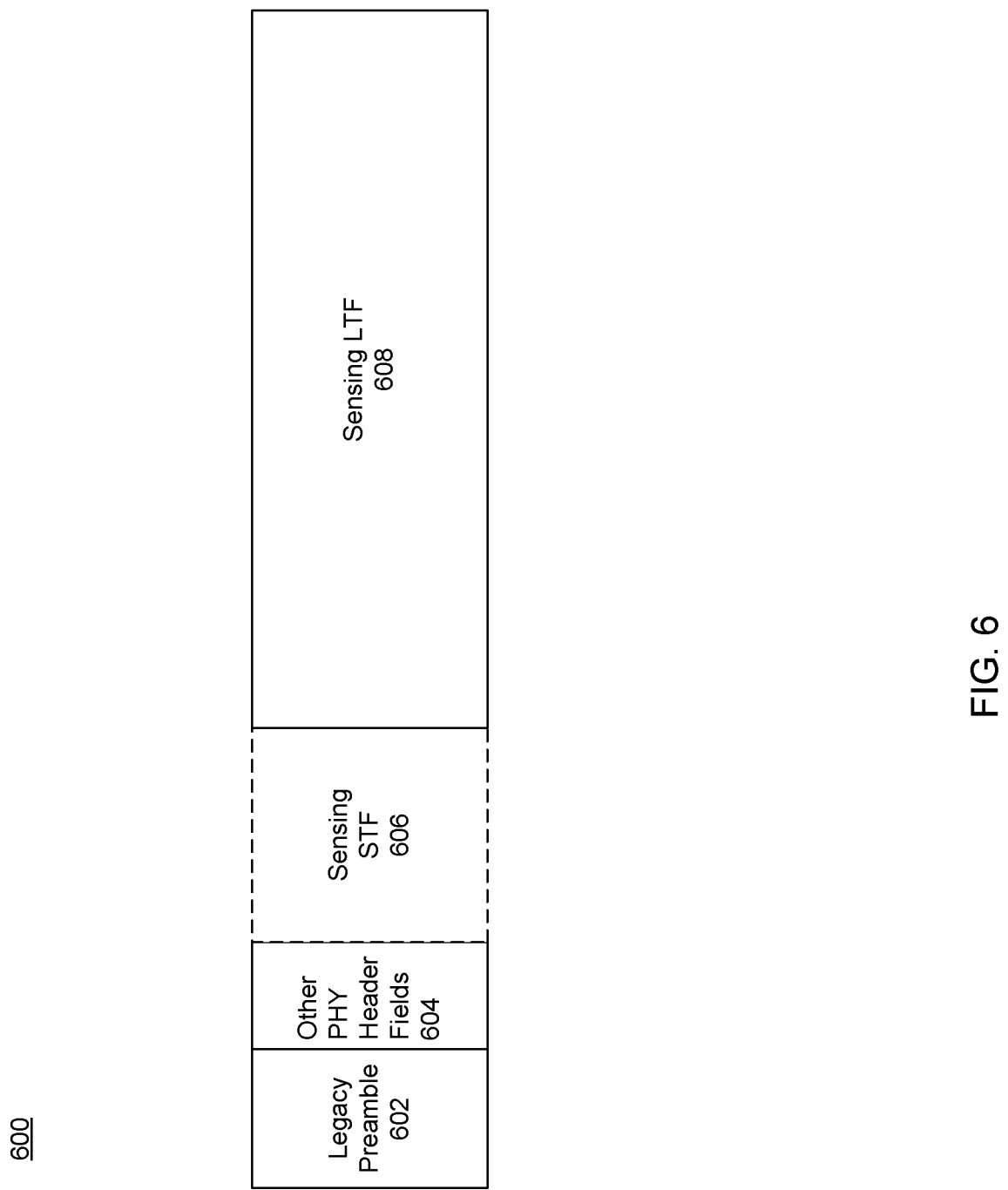
FIG. 6 illustrates a sensing physical protocol data unit (PPDU) format, according to an embodiment of the present disclosure.

FIG. 6 illustrates a sensing PPDU 600, according to an embodiment of the present disclosure. Sensing PPDU format 600 may refer to a general format and illustrate subfields in PPDU in PHY. As discussed herein, sensing frame may be an NDP-like frame. Sensing frame transmitted through or by sensing PPDU 600 may be similar to sensing frames 248, 348, 447, 448 or 449 as described herein. Sensing PPDU 600 may comprise one or more of a legacy preamble 602, one or more PHY header fields 604, sensing short training field (STF) 606 and sensing long training field (LTF) 608.

As may be appreciated by a person skilled in the art, sensing LTF 608 may be used for channel estimation and other applications in 802.11. Sensing STF 606 may not be necessary depending on the necessity of automatic gain control (AGC). It should be further appreciated that sensing may be done at low frequency bands (e.g., 2.4, 5 and 6 GHz) and high frequency millimeter-Wave (mm-Wave) band (e.g., 37 to 71 GHz) in which Wi-Fi devices operate. Sensing in higher frequencies may provide better sensing accuracy due to increased channel width.

Figure 7:
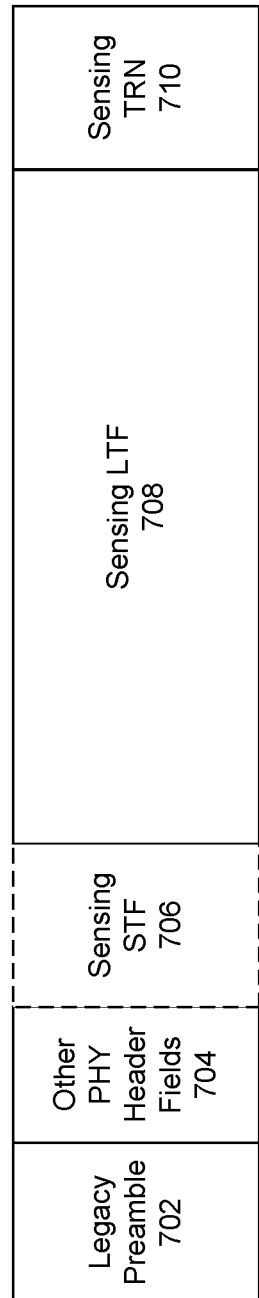
FIG. 7 illustrates another sensing PPDU format, according to an embodiment of the present disclosure.

FIG. 7 illustrates another sensing PPDU, according to an embodiment of the present disclosure. Sensing PPDU 700 may refer to the format for 60 GHz band. Sensing PPDU 700 may comprise one or more of a legacy preamble 702, one or more PHY header fields 704, sensing STF 706, sensing LTF 708 and a sensing training (TRN) field 710 as illustrated.

Compared to sensing PPDU 600, sensing PPDU 700 may include the additional field sensing TRN 710. The sensing TRN 710 field may be used for high frequency mm-Wave band to allow for covering a wider angle and wider bandwidth. Since beams in mm-Wave may be narrow, one beam may be insufficient to cover a wide angle, and therefore, sweeping or scanning the beam in different directions (e.g., changing antenna direction for each TRN sub-field) may allow for covering a wider angle for sensing purposes.

Sensing frames may be denoted as Sensing LTF for single CSI measurement or Sensing TRN or both. Sensing TRN 710 may comprise a series of training units for potential single or multiple CSI measurements using a single sensing frame.

Figure 8:
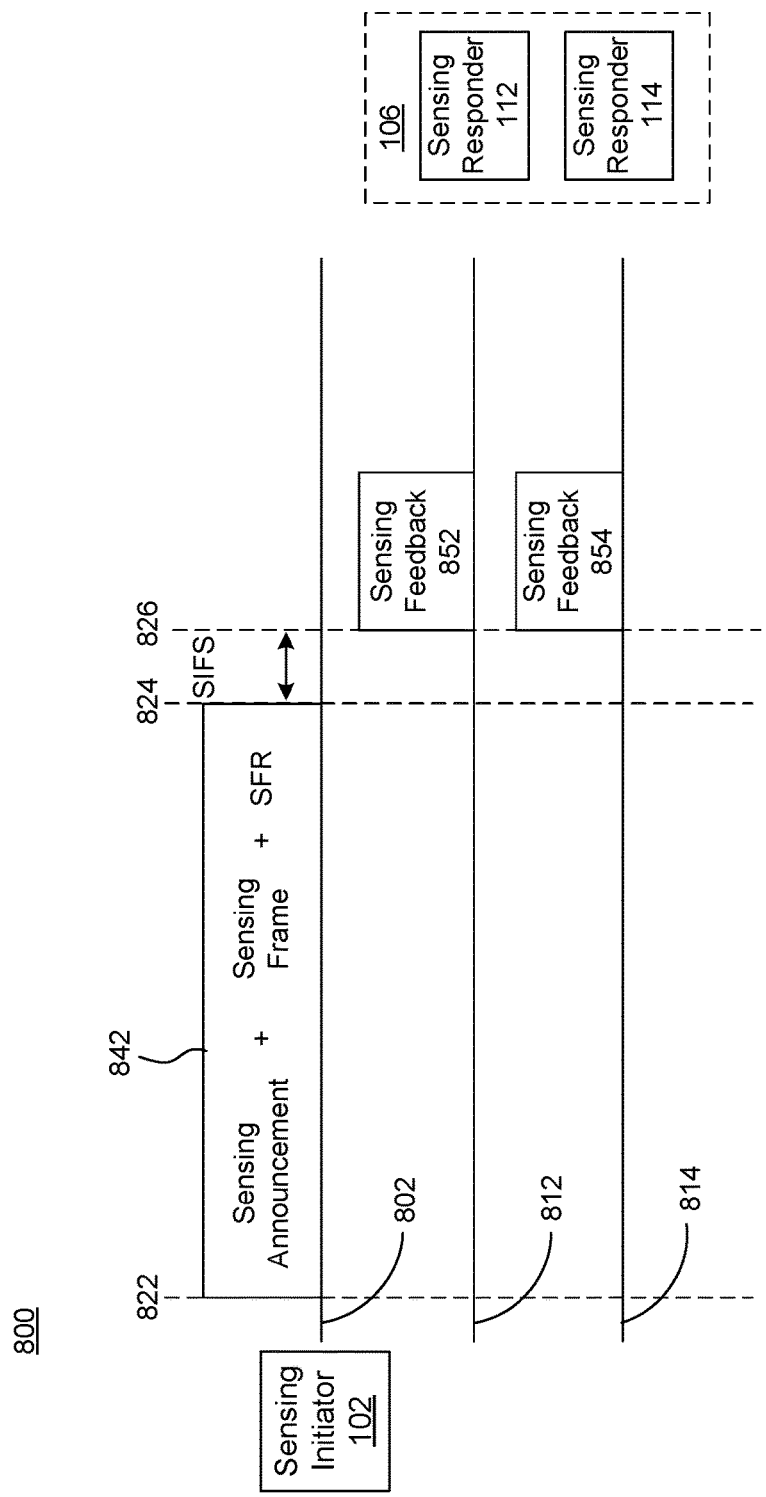
FIG. 8 illustrates an alternative procedure for DL sensing, according to an embodiment of the present disclosure.

FIG. 8 illustrates an alternative procedure for DL sensing, according to an embodiment of the present disclosure. Line 802 may represent actions performed by the sensing initiator 102 with respect to time. Lines 812 and 814 may represent actions performed by sensing responders 106 (e.g., receptively sensing responder 112 and 114). In this case the Initiator integrates the announcement, sensing reference sequence, and sensing feedback request actions in one frame.

DL sensing procedure or process 800 may begin at time 822, in which the sensing initiator 102 may transmit, to sensing responders 106 (e.g., receptively sensing responder 112 and 114), in one frame 842 one or more of: sensing announcement, sensing frame and SFR as illustrated. The resource allocation such as RU or spatial resource may be moved to the PHY Header in this case or may be indicated in the MAC header like any other trigger frame. SIFS time units after receiving (e.g., reception at time 824), sensing responders 106 (e.g., receptively sensing responder 112 and 114) may send, at time 826, sensing feedback 852 and 854. In process 800, the sensing feedback 852 and 854 are sent in parallel, however, a person skilled in the art may appreciate that sensing feedback 852 and 854 may be sent serially as well.

Figure 9:
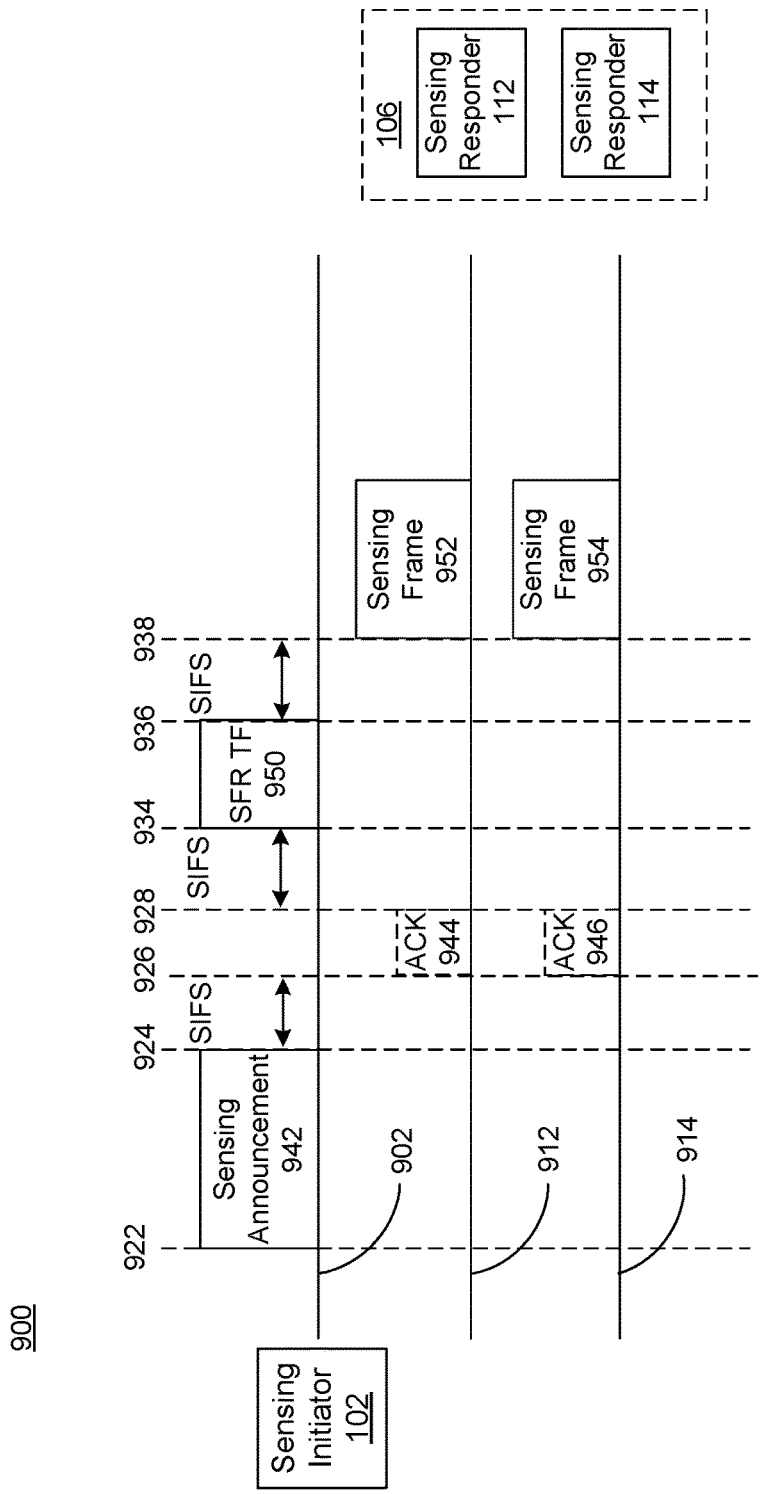
FIG. 9 illustrates an uplink (UL) sensing procedure, according to an embodiment of the present disclosure.

FIG. 9 illustrates an uplink (UL) sensing procedure, according to an embodiment of the present disclosure. Line 902 may represent actions performed by the sensing initiator 102 with respect to time. Lines 912 and 914 may represent actions performed by sensing responders 106 (e.g., receptively sensing responder 112 and 114).

As mentioned herein, UL procedure or process may refer to the embodiments in which one or more sensing frames are transmitted by the one or more sensing responders 106 toward the sensing initiator 102.

UL sensing procedure or process 900 may begin at time 922, in which the sensing initiator 102 may announce via the sensing announcement 942 that a sensing procedure is to begin. In some embodiments, the sensing initiator 102 may send the sensing announcement 942 to the sensing responders 106 (e.g., sensing responders 112 and 114).

Sensing announcement frame 942 (in the UL direction) may include the sequences (LTFs) to be used by each STA device (e.g., sensing responders 106).

At time 926, the sensing responders 106 (e.g., sensing responder 112 and sensing responder 114) may send an acknowledgement (ACK) 944 and 946. ACK 944 and 946 may be optional and may be transmitted by sensing responders 106 (e.g., sensing responder 112 and sensing responder 114) to indicate their willingness to participate in the sensing process 900. ACK 944 and 946 may be transmitted SIFS time units after the reception (e.g., reception may be at time 924 and transmission at time 926) of the sensing announcement frame 942.

SIFS units after receiving (e.g., reception at time 928) ACKS 944 and 946, sensing initiator 102 may send, at time 934, SFR TF 950 to sensing responders 106 (e.g., sensing responder 112 and sensing responder 114). In some embodiments, the sensing initiator 102 may broadcast or multicast the SFR TF 950 to sensing responders 106 (e.g., sensing responder 112 and sensing responder 114).

SIFS units after receiving (e.g., reception at time 936) SFR TF 950, sensing responder 106 (e.g., sensing responders 112 and 114) may send at time 938 sensing frames 952 and 954 to sensing initiator 102. As discussed in reference to other embodiments, sensing frames 952 and 954 may be NDP-like frames and may correspond to one or more sensing frames according to the list of scheduled STAs in the sensing announcement frame 942.

In some embodiments, the sensing sequence corresponding to sensing frame 952 transmitted by sensing responder 112 may be different from sensing sequence corresponding to sensing frame 954 transmitted by sensing responder 114. The decision on which sensing sequence is to be transmitted by which sensing responder 106 may be indicated by the sensing announcement 942.

The sensing frames 952 and 954 transmitted by sensing responders 106 may go through a medium, which may include an object, and will reach the sensing initiator 102. Upon receiving the sensing frames 952 and 954, the sensing initiator 102 may extract the changes in CSI that may have been caused by the object in the medium. The sensing initiator 102 may then process the extracted signal and perform verification, identification procedures.

Although sensing frames 952 and 954 are illustrated to be transmitted in parallel, in other embodiments, the sensing frames 952 and 954 may be transmitted in series.

Figure 10:
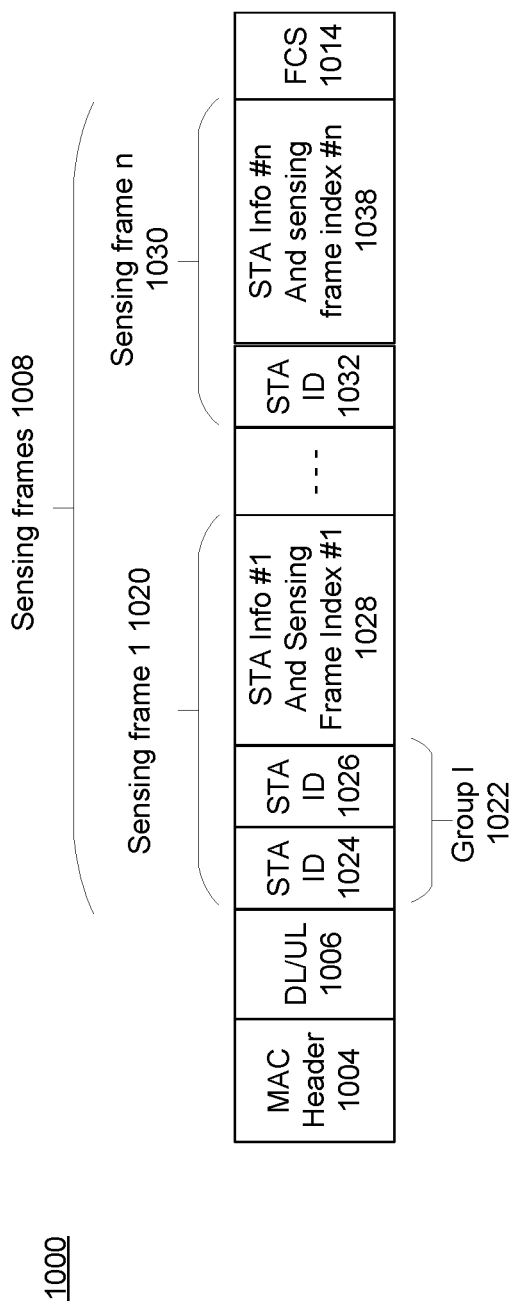
FIG. 10 illustrates an uplink (UL) sensing announcement frame, according to an embodiment of the present disclosure.

FIG. 10 illustrates an UL sensing announcement frame, according to an embodiment of the present disclosure.

The UL sensing announcement frame 1000 may be similar to sensing announcement frame 942. The UL sensing announcement frame 1000 may comprise one or more of a MAC header 1004, an indicator of DL or UL 1006, one or more assignment indicators of sensing frames 1008 and FCS 1014.

Different sensing frames may be assigned for different identification and recognition tasks by sub-carrier selection or more emphasis on the amplitude or the phase of the signaling. Each sensing frame may be of fixed length and may start by an indication of the number of STA ID fields. In some embodiments one sensing frame and its corresponding one or more sequences (e.g., sensing frame 1 1020 comprising STA info #1 and sensing frame index #1 1028) may be assigned to a group (e.g., group I 1022 comprising STA IDs 1024 and 1026). In some embodiments, a sensing frame and its corresponding one or more sequences (e.g., sensing frame n 1030 comprising STA info #n and sensing frame index #n 1038) may be assigned to an identified station (e.g., STA ID 1032).

In some embodiments, the sensing frame index may be sent, which may reduce overhead. As may be appreciated by a person skilled in the art, in embodiments in which a sensing frame index may be sent, then exchanges of sensing frame indices, at an earlier stage, may be required, since sensing frames should be known by both initiator and responder. The usage of a specific sensing frame by one or more responders 106 may be indicated with a corresponding sensing frame index.

Embodiments may provide for a common frame format to start a sensing procedure in the DL and the UL directions as described herein.

Figure 11:
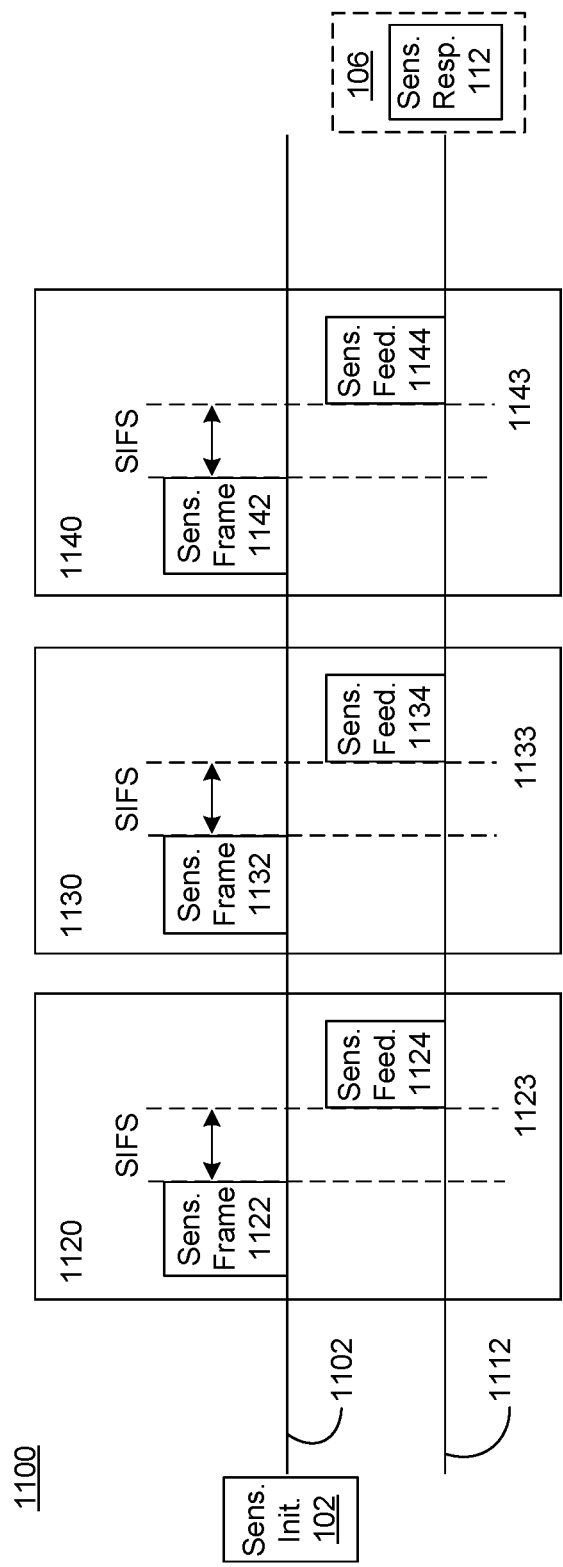
FIG. 11 illustrates a periodic sensing procedure with differential feedback according to an embodiment of the present disclosure.

FIG. 11 illustrates a periodic sensing procedure with differential feedback according to an embodiment of the present disclosure. The procedure 1100 may comprise sensing procedures 1120, 1130 and 1140. Line 1102 may represent actions performed by the sensing initiator 102 with respect to time. Lines 1112 may represent actions performed by sensing responders 106 (e.g., sensing responder 112). For ease of illustrating differential feedback, process 1100 may only show sensing frame and sensing feedback frame between sensing initiator 102 and sensing responder 112.

In procedure 1100, for periodic sensing, the information carried in the sensing feedback (e.g., sensing feedback 1134 in sensing procedure 1130) may be a difference from the past feedback information (e.g., sensing feedback 1124 in sensing procedure 1120).

In an embodiment, sensing procedure 1120 may comprise sensing initiator 102 sending a sensing frame 1122 to a sensing responder e.g., sensing responder 112. The sensing responder 112 may respond, at time 1123, to the sensing initiator 102 with a sensing feedback frame 1124 based on the received sensing frame 1122.

Sensing procedure 1130 may then comprise sensing initiator 102 sending a sensing frame 1132 which may be similar to sensing frame 1122 of the procedure 1120. Sensing responder 112 may respond (to the sensing frame 1132), at time 1133, with sensing feedback 1134. In some embodiments, sensing feedback 1134 may be the difference of the measured results at time 1133 compared to measured results at time 1123 (sensing feedback 1124).

Sensing procedure 1140 may comprise sensing initiator 102 sending a sensing frame 1142 which may be similar to sensing frame 1132 of the procedure 1130. Sensing responder 112 may respond (to the sensing frame 1142), at time 1143, with sensing feedback 1144. In some embodiments, sensing feedback 1144 may be the difference of the measured results at time 1143 compared to measured results at time 1133 (sensing feedback 1134). By sending the difference of the past feedback information, as described herein, process 1100 may allow for reduced overhead.

As may be appreciated by a person skilled in the art, examples of sensing PPDU may include LTF/TRN sequence as defined in 802.11. Sensing frames may further include multiple orthogonal sequences which may be generated by applying appropriate transformation.

FIG. 12 illustrates a sensing feedback frame design, according to an embodiment of the present disclosure. Sensing feedback frame 1200 may be an action frame that includes the measurement results which are fed back to the sensing initiator 102 according to the sensing procedures described herein. The sensing feedback frame 1200 (or sensing feedback action frame) may belong to a category, which may be called as the Sensing Category. The sensing feedback frame may include one or more of MAC header, and a frame body. In some embodiments, the measurement results may be included in the frame body field.

Embodiments may provide for defined common frame formats to simplify post processing of sensing measurements.

Embodiments described herein may provide for a sensing procedure initiated by an AP or a non-AP STA using a sensing announcement frame. Embodiments may further provide for enhanced sensing announcement frame formats, which may include indication and grouping of sensing responders. Embodiments may further provide for DL and UL sensing procedures. Embodiments may further provide for a high-level design of sensing feedback frames. Embodiments may further provide for differential sensing.

Figure 13:
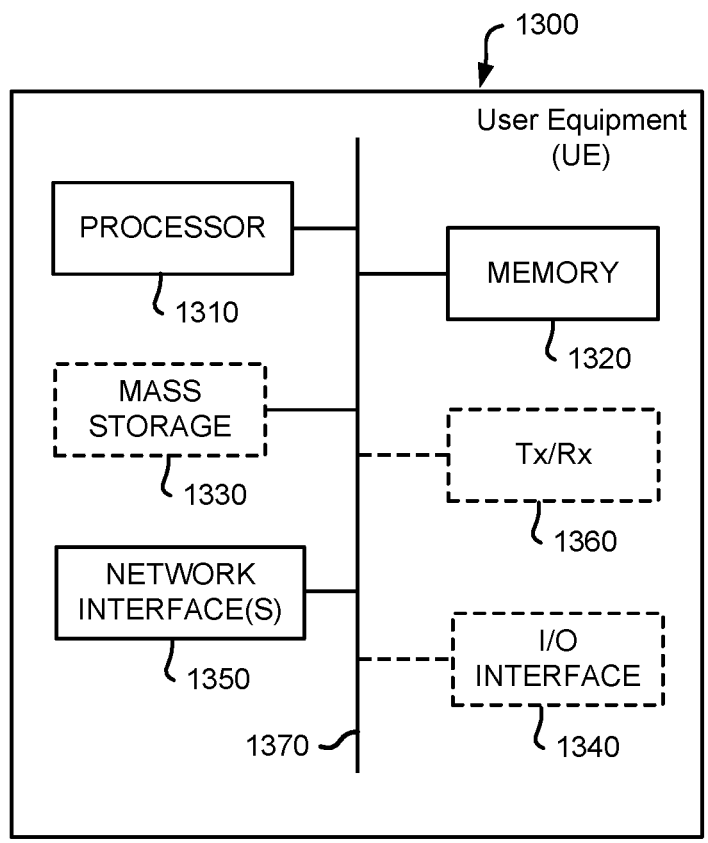
FIG. 13 is a schematic diagram of a user equipment (UE) that may perform any or all of operations of the above methods and features explicitly or implicitly described herein, according to different embodiments of the present invention.

FIG. 13 is a schematic diagram of UE 1300 that may perform any or all of operations of the above methods and features explicitly or implicitly described herein, according to different embodiments of the present invention. For example, a computer equipped with network function may be configured as UE 1300.

As shown, the UE 1300 may include a processor 1310, such as a Central Processing Unit (CPU) or specialized processors such as a Graphics Processing Unit (GPU) or other such processor unit, memory 1320, non-transitory mass storage 1330, input-output interface 1340, network interface 1350, and a transceiver 1360, all of which are communicatively coupled via bi-directional bus 1370. According to certain embodiments, any or all of the depicted elements may be utilized, or only a subset of the elements. Further, UE 1300 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1320 may include any type of non-transitory memory such as static random access memory (SRAM), dynamic random access memory (DRAM), synchronous DRAM (SDRAM), read-only memory (ROM), any combination of such, or the like. The mass storage element 1330 may include any type of non-transitory storage device, such as a solid state drive, hard disk drive, a magnetic disk drive, an optical disk drive, USB drive, or any computer program product configured to store data and machine executable program code. According to certain embodiments, the memory 1320 or mass storage 1330 may have recorded thereon statements and instructions executable by the processor 1310 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A computing device, comprising:
a processor; and
a non-transitory computer-readable memory storing instructions that when executed by the processor cause an initiating wireless station (STA) to perform actions comprising:
sending, to a plurality of responder STAs, a sensing request for detecting objects and human activities, the sensing request comprising a sensing announcement frame indicating identifiers of the plurality of responder STAs; and
receiving, from the plurality of responder STAs, one or more responses based on the sensing request.

2. The computing device of claim 1, wherein:
the sensing announcement frame indicates a downlink sensing; and
the actions further comprise sending, to the plurality of responder STAs, one or more sensing frames.

3. A computing device, comprising:
a processor; and
a non-transitory computer-readable memory storing instructions that when executed by the processor cause an initiating wireless station (STA) to perform actions comprising:
sending, to a plurality of responder STAs, a sensing request for detecting objects and human activities, the sensing request comprising a sensing announcement frame indicating:
identifiers of the plurality of responder STAs; and
resource unit assignments for receiving acknowledgements from the plurality of responder STAs;
receiving, from the plurality of responder STAs, one or more responses based on the sensing request; and
receiving, from the plurality of responder STAs, the acknowledgements indicating a willingness to participate in the sensing procedure.

4. The computing device of claim 2, wherein:
the actions further comprise sending, to the plurality of responder STAs, a sensing feedback request (SFR) trigger frame (TF); and
the one or more responses comprise one or more sensing feedbacks comprising channel state information (CSI) based on the one or more sensing frames.

5. The computing device of claim 4, wherein the SFR TF indicates resource assignment for simultaneous transmission of the one or more sensing feedbacks.

6. The computing device of claim 2, wherein:
the actions further comprise sending, to a first responder STA of the plurality of responder STAs, a first sensing feedback request (SFR) poll frame; and
the receiving, from the plurality of responder STAs, one or more responses based on the sensing request comprises receiving, from the first responder STA, a first sensing feedback that comprises channel state information (CSI).

7. The computing device of claim 6, wherein the actions further comprise:
after receiving the first sensing feedback, sending to a second responder STA of the plurality of responder STAs, a second sensing feedback request (SFR) poll frame; and
receiving, from the second responder STA, a second sensing feedback, based on the one or more sensing frames.

8. The computing device of claim 2, wherein the one or more sensing frames are sent at a frame rate indicated by the sensing announcement frame.

9. The computing device of claim 2, wherein the sensing announcement frame further indicates, for each responder STA of the plurality of responder STAs, a feedback type comprising one or more of: phase channel information and amplitude channel information.

10. The computing device of claim 2, wherein each of the one or more sensing frames comprises one or more of: a legacy preamble, a PHY header field, sensing short training field, a long training field, and a sensing training field.

11. The computing device of claim 2, wherein:
the sending, to the plurality of responder STAs, one or more sensing frames comprises: sending, to a first responder STA of the plurality of responder STAs, a first sensing frame; and
the receiving, from the plurality of responder STAs, one or more responses based on the sensing request comprises: receiving, from the first responder STA, a first sensing feedback comprising channel state information (CSI) measurements based in part on the first sensing frame;
and
the actions further comprise:
sending, to the first responder STA, a second sensing frame; and
receiving, from the first responder STA, a second sensing feedback based in part on the second sensing frame and the first sensing feedback, the second sensing feedback being a difference of CSI measurements compared to the first sensing feedback.

12. The computing device of claim 1, wherein:
the sensing request further comprises one or more of: a sensing frame and a sensing feedback request (SFR); and
the SFR is one of a trigger frame (TF) and a poll frame.

13. A computing device, comprising:
a processor; and
a non-transitory computer-readable memory storing instructions that when executed by the processor cause an initiating wireless station (STA) to perform actions comprising:
sending, to a plurality of responder STAs, a sensing request for detecting objects and human activities, the sensing request comprising a sensing announcement frame indicating:
identifiers of the plurality of responder STAs; and
an uplink (UL) sensing;
receiving, from the plurality of responder STAs, one or more responses based on the sensing request, including receiving one or more sensing frames based in part on the sensing announcement frame and the SFR TF; and
sending, to the plurality of responder STAs, a sensing feedback request (SFR) trigger frame (TF).

14. The computing device of claim 13, wherein the sensing announcement frame further indicates the one or more sensing frames to be used by each responder STA of the plurality of responder STAs.

15. The computing device of claim 13, wherein:
the actions further comprise sending, to a first responder STA of the plurality of responder STAs, a first sensing feedback request (SFR) poll frame; and
the receiving, from the plurality of responder STAs, one or more responses based on the sensing request comprises receiving, from the first responder STA, a first sensing frame based in part on the sensing announcement frame and the first SFR poll frame.

16. The computing device of claim 15, wherein the actions further comprise:
after receiving the first sensing frame, sending, to a second responder STA of the plurality of responder STAs, a second sensing feedback request (SFR) poll frame; and
receiving, from the second responder STA, a second sensing frame, based in part on the sensing announcement frame and the second SFR poll frame.

17. A computing device comprising:
a processor;
a non-transitory computer-readable memory storing instructions that when executed by the processor cause a responding wireless station (STA) to perform actions comprising:
receiving, from an initiating STA, a sensing request for detecting objects and human activities, the sensing request comprising a sensing announcement frame indicating an identifier (ID) of the responder STA; and
sending, to the initiating STA, one or more responses based on the sensing request.

18. The computing device of claim 17, wherein:
the sensing announcement frame indicates a downlink sensing; and
the actions further comprise receiving, from the initiating STA, one or more sensing frames.

19. The computing device of claim 18, wherein:
the actions further comprise receiving, by the responder STA from the initiating STA, a sensing feedback request (SFR);
the one or more responses comprise one or more sensing feedbacks comprising channel state information (CSI) based on the one or more sensing frames; and
the SFR is one of a trigger frame and a poll frame.

20. The computing device of claim 17, wherein:
the actions further comprise receiving a sensing feedback request (SFR);
the sensing announcement frame further indicates an uplink sensing;
the sending, to the initiating STA, one or more responses based on the sensing request comprises sending, to the initiating STA, one or more sensing frames based in part on the sensing announcement frame and the SFR; and
the SFR is one of a trigger frame and a poll frame.

* * * * *